(12) United States Patent
Pritchard (10) Patent No.: US 9,850,962 B2
(45) Date of Patent: Dec. 26, 2017

(54) ROTARY COUPLING FOR AN ALL-WHEEL DRIVE VEHICLE

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 157 days.

(21) Appl. No.: 14/934,960

(22) Filed: Nov. 6, 2015

(65) Prior Publication Data

US 2016/0195144 A1 Jul. 7, 2016

Related U.S. Application Data

(60) Provisional application No. 62/100,123, filed on Jan. 6, 2015.

(51) Int. Cl.
*B60W 10/18* (2012.01)
*F16D 25/12* (2006.01)
*B60K 17/02* (2006.01)
*B60K 17/34* (2006.01)
*F16D 25/0638* (2006.01)

(52) U.S. Cl.
CPC ............ *F16D 25/123* (2013.01); *B60K 17/02* (2013.01); *B60K 17/34* (2013.01); *F16D 25/0638* (2013.01); *F16D 2300/06* (2013.01); *F16D 2300/26* (2013.01)

(58) Field of Classification Search
CPC ............... F16D 25/123; F16D 25/0638; F16D 2300/06; F16D 2300/26; B60K 17/34; B60K 17/02
See application file for complete search history.

(56) References Cited

U.S. PATENT DOCUMENTS

| | | | |
|---|---|---|---|
| 2015/0337952 A1* | 11/2015 | Cho ...................... | B60W 10/10 701/54 |
| 2016/0123465 A1* | 5/2016 | Cho ........................ | F16H 63/46 477/176 |
| 2016/0377129 A1* | 12/2016 | Cho ...................... | F16D 48/068 701/51 |

* cited by examiner

*Primary Examiner* — David J Hlavka
(74) *Attorney, Agent, or Firm* — Young Basile Hanlon & MacFarlane, P.C.

(57) ABSTRACT

A rotary coupling (200) for an all-wheel drive vehicle includes a housing (210), an input part (212), an output part (214), and a clutch (220) disposed within a clutch area (222) of the housing (210) and is movable between an engaged position and a disengaged position to change an amount of torque transferred from the input part (212) to the output part (214). A fluid reservoir (260) is defined in the housing (210). A lubrication valve (250) is movable between an open position and a closed position for controlling supply of a fluid from the fluid reservoir (260) to the clutch area (222) of the housing (210). An actuator (238) is connected to the clutch (220) to move the clutch (220) between the engaged position and the disengaged position and connected to the lubrication valve (250) to move the lubrication valve (250) between the open position and the closed position.

15 Claims, 7 Drawing Sheets

ROTARY COUPLING FOR AN ALL-WHEEL DRIVE VEHICLE

BACKGROUND

This application claims the benefit of U.S. Provisional Application No. 62/100,123, which was filed on Jan. 6, 2015.

BACKGROUND

All-wheel drive drivetrains for vehicles allow driving power to be delivered to all four wheels of the vehicle. By delivering driving power to all four wheels, vehicle performance is improved when surface conditions are poor. As examples, all-wheel drive systems can improve vehicle performance when road surfaces are slippery as a result of rain or snow, and when the road surface itself is of poor quality, such as dirt or gravel road surfaces.

In all wheel-drive vehicles with a transversely mounted front engine layout, a transaxle is typically utilized to provide a desired gear ratio and to distribute driving power to the left and right front wheels by way of a front differential and a front axle. A power transfer unit receives driving power from the front axle and transfers driving power to the rear wheels of the vehicle by way of a driveshaft, a rear differential, and a rear axle. In some implementations, a rotary coupling is provided to connect and disconnect power transfer to the rear wheels, and/or to prevent rotation of driveline components such as the drive shaft when power is not being supplied to the rear wheels. Some rotary couplings are also able to vary the amount of torque provided to the rear wheels of the vehicle.

One design for a rotary coupling uses a hydraulic clutch to connect and disconnect torque transmission between an input part and an output part. The terms "input part" and "output part" are used for convenience, and are not intended to imply that torque is always applied at the input part, as this can vary based on the configuration of a vehicle and the circumstances under which it is operated. When the clutch is engaged to transfer torque between the input part and the output part, hydraulic fluid within the clutch is utilized to lubricate and cool the clutch pack. When the clutch is disengaged, however, the presence of hydraulic fluid within the clutch pack can cause unintended partial engagement of the clutch, resulting in parasitic losses.

SUMMARY

A rotary coupling for an all-wheel drive vehicle includes a housing, an input part, an output part, and a clutch disposed within a clutch area of the housing and is movable between an engaged position and a disengaged position to change an amount of torque transferred from the input part to the output part. A fluid reservoir is defined in the housing. A lubrication valve is movable between an open position and a closed position for controlling supply of a fluid from the fluid reservoir to the clutch area of the housing. An actuator is connected to the clutch to move the clutch between the engaged position and the disengaged position and connected to the lubrication valve to move the lubrication valve between the open position and the closed position.

A drivetrain for an all-wheel drive vehicle includes an engine, a transmission, at least a first wheel, and a rotary coupling (200) that is operable to selectively deliver driving power to the first wheel. The rotary coupling includes a housing (210), an input part (212), an output part (214), and a clutch (220) that is disposed within a clutch area (222) of the housing (210) and is movable between an engaged position and a disengaged position to change an amount of torque transferred from the input part (212) to the output part (214). The rotary coupling also includes a fluid reservoir defined in the housing, and a lubrication valve that is movable between an open position and a closed position for controlling supply of a fluid from the fluid reservoir to the clutch area of the housing. The rotary coupling also includes an actuator that is connected to the clutch to move the clutch between the engaged position and the disengaged position and connected to the lubrication valve to move the lubrication valve between the open position and the closed position.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a rotary coupling for an all-wheel drive vehicle.

Figure 1:
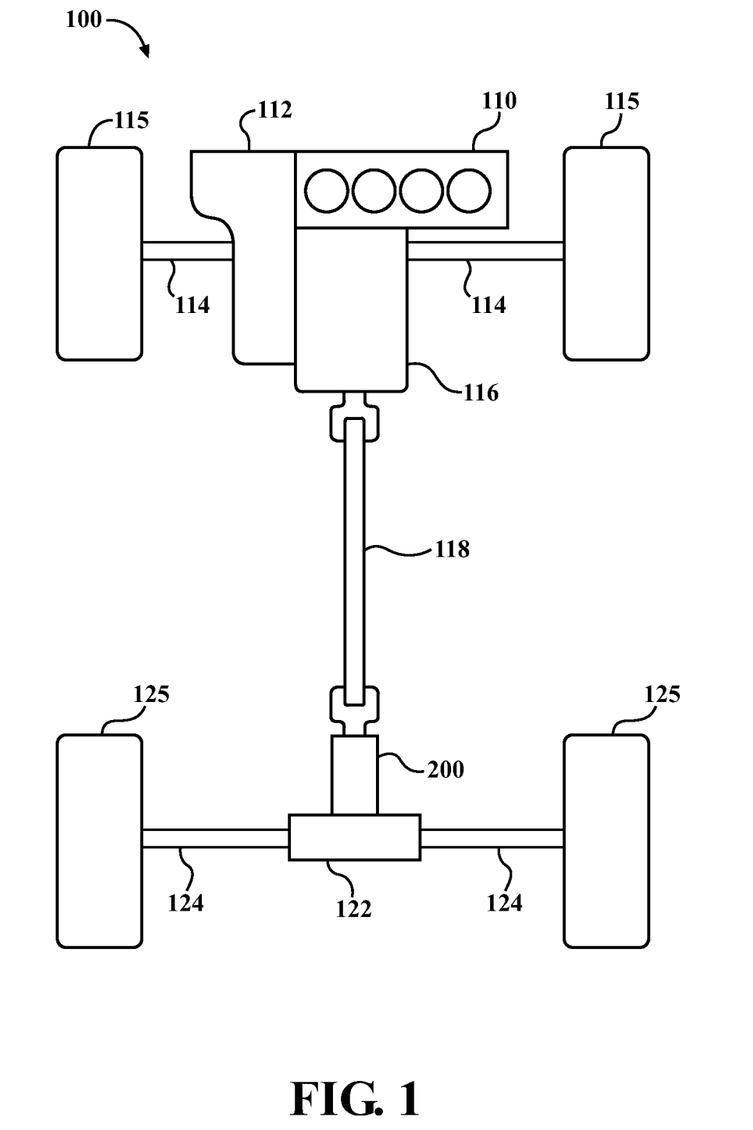
FIG. 1 is an illustration showing an example of a drivetrain for an all-wheel drive vehicle that includes a rotary coupling.

FIG. 1 shows a drivetrain 100 for an all-wheel drive vehicle that includes a rotary coupling 200. It should be understood that the drivetrain 100 of FIG. 1 is an example of an application in which the rotary coupling 200 can be utilized. The rotary coupling 200 can also be utilized in other drivetrains of various configurations for the same purpose of for a different purpose.

The drivetrain 100 includes an engine 110 that is coupled to a transmission 112. The engine 110 is the prime mover of the drivetrain 100 and can be, as examples, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission. In the illustrated example, the engine 110 is front-mounted in a transverse configuration and the transmission 112 is an automatic transaxle.

The transmission 112 provides driving power to a front axle 114 and to a power transfer unit 116. The front axle 114 can be, as examples, a solid axle or a pair of independent half axles. The front axle 114 drives a pair of wheels 115 that are fitted with tires.

The power transfer unit 116 is operable to transfer a portion of the driving power from the transmission 112 to a driveshaft 118. The power transfer unit 116 can also be operable to connect and disconnect transmission of driving power to the driveshaft 118, such as by incorporating a clutch.

The driveshaft 118 extends from the power transfer unit 116 to the rotary coupling 200. The rotary coupling 200 is operable to connect and disconnect transmission of torque using a clutch (not shown in FIG. 1). This allows the driveshaft 118 to be disconnected from the rear wheels of the vehicle when the power transfer unit 116 is disengaged to prevent rotation of the driveshaft 118 via the rear wheels of the vehicle. The rotary coupling 200 can also be operable to transmit driving power of a desired degree, such as by slipping engagement of the clutch, to allow variable distribution of driving power to the front and rear wheels of the vehicle.

A rear differential 122 receives driving power from the rotary coupling 200 and distributes the driving power to a rear axle 124. The rear axle 124 can be, as examples, a solid axle or a pair of independent half axles. The rear axle 124 provides driving power to a pair of rear wheels 125 that are fitted with tires.

Figure 2:
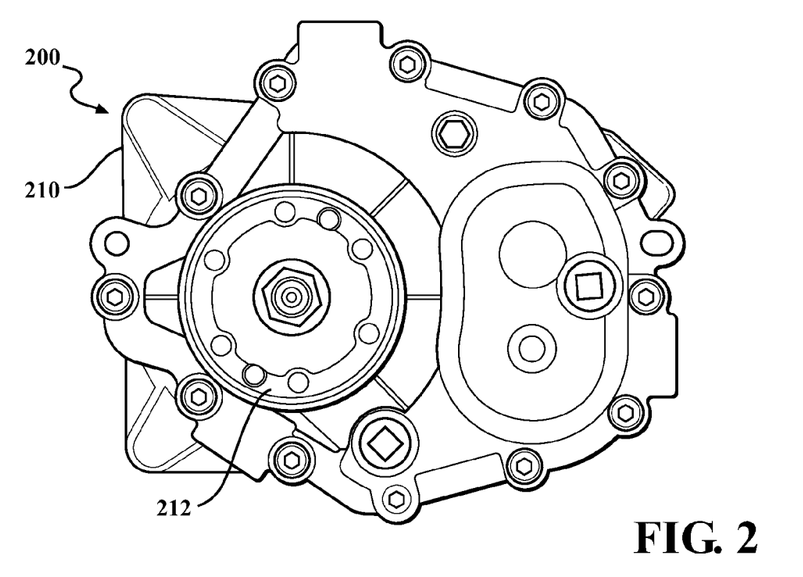
FIG. 2 is a front view of the rotary coupling.
Figure 3:
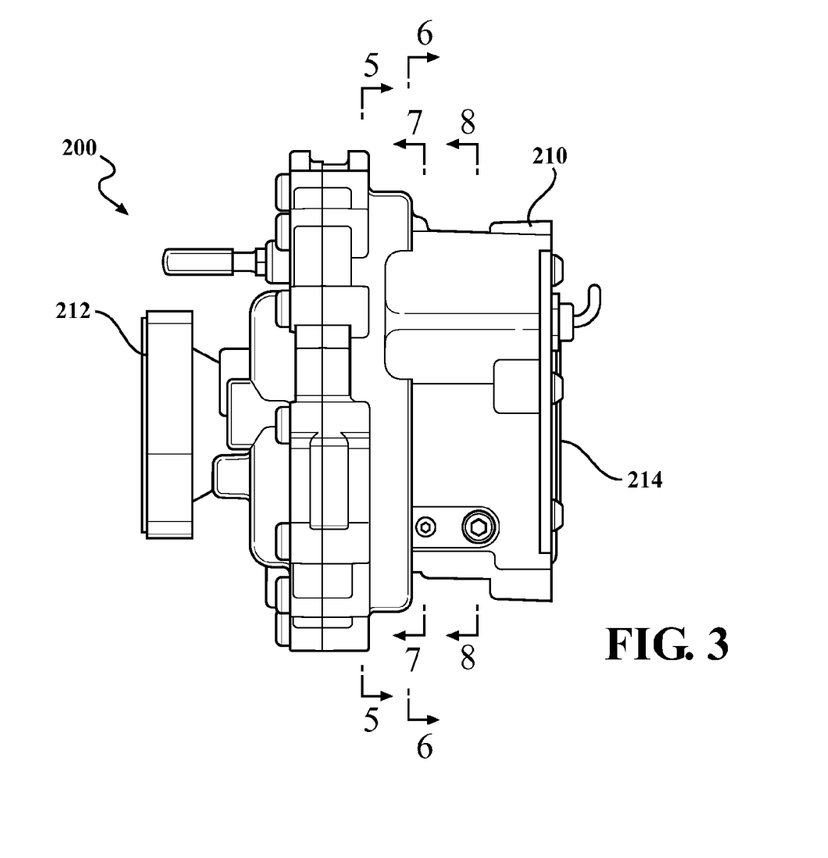
FIG. 3 is a side view of the rotary coupling.
Figure 4:
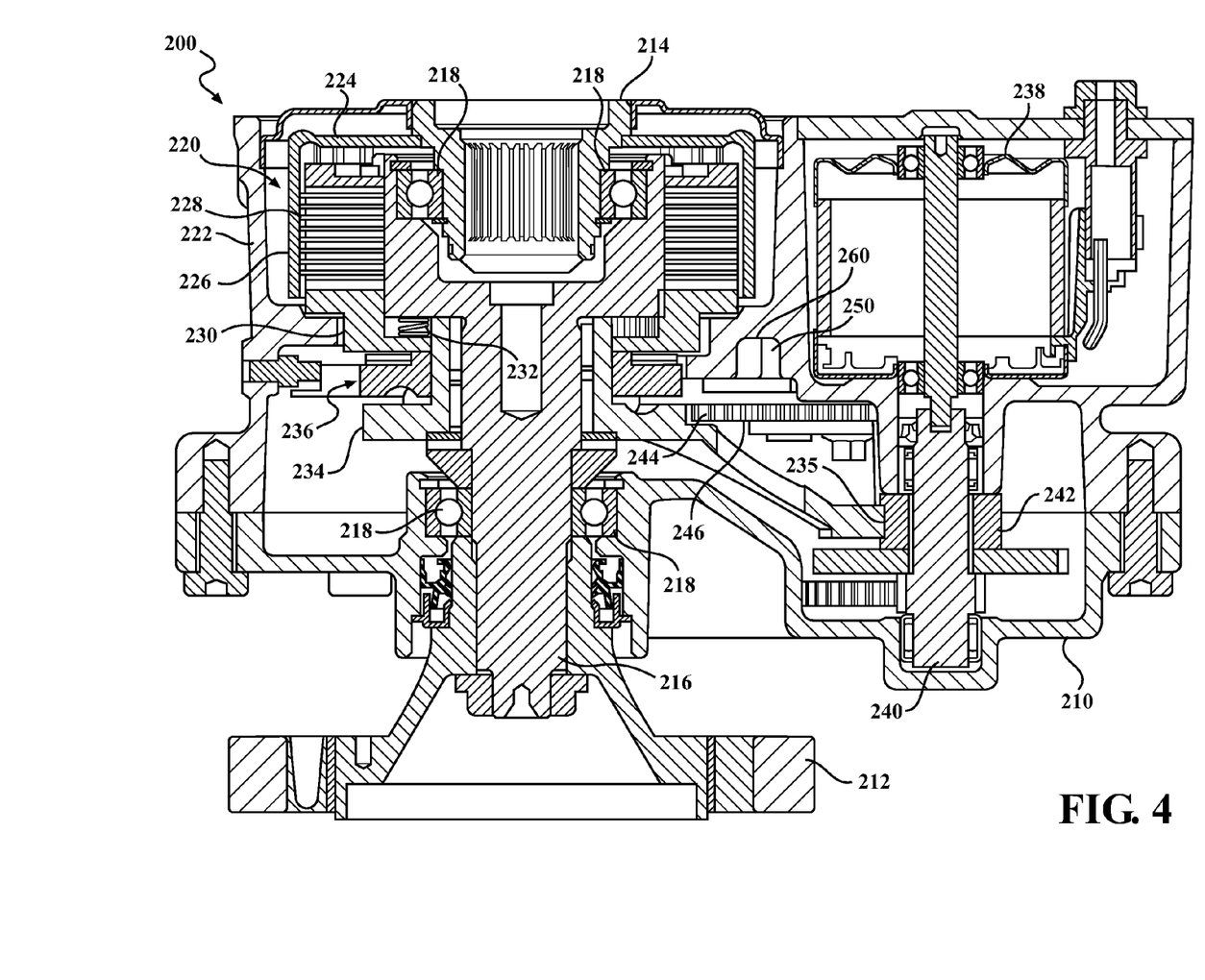
FIG. 4 is a top cross-section view of the rotary coupling.
Figure 5:
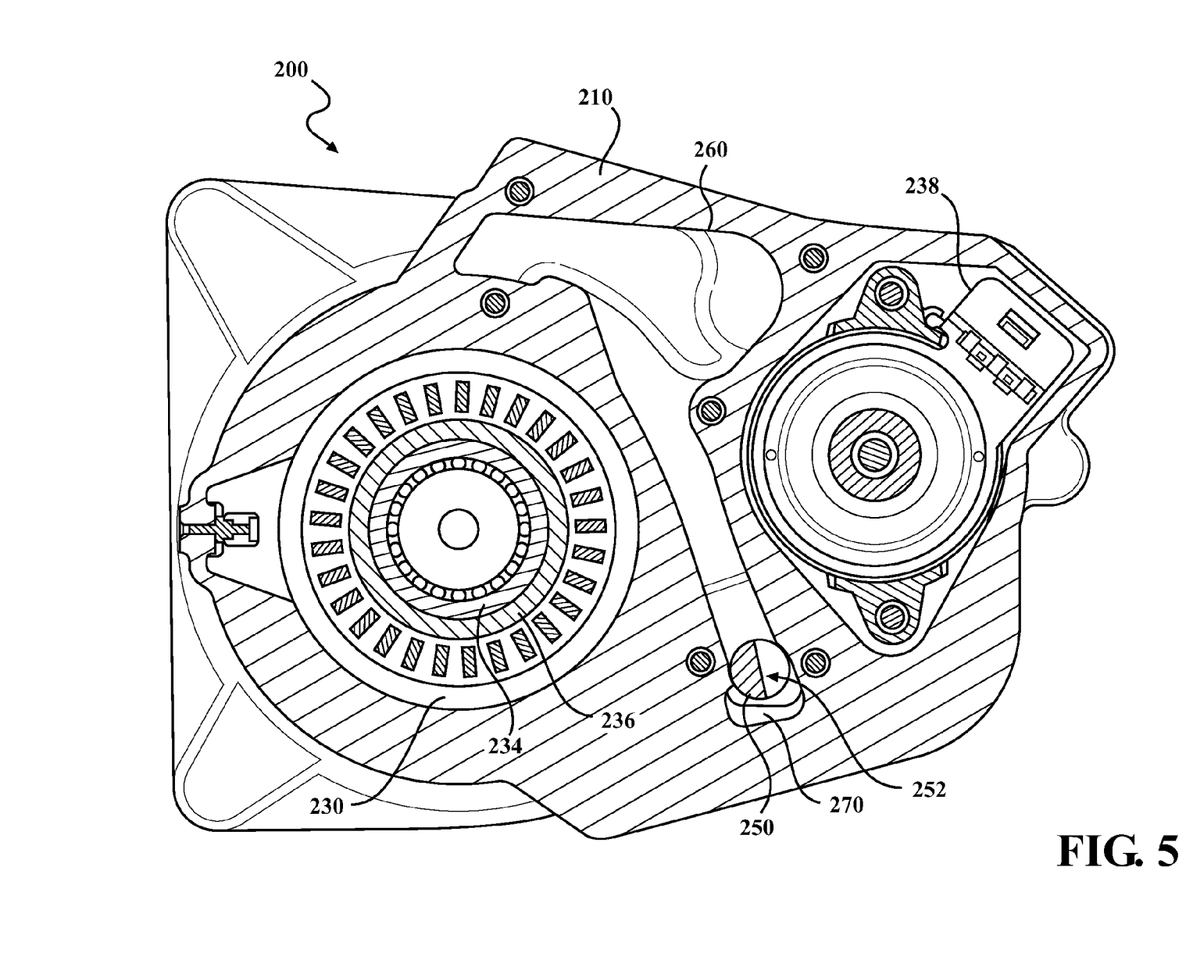
FIG. 5 is a cross-section view of the rotary coupling taken along line E-E of FIG. 3.
Figure 6:
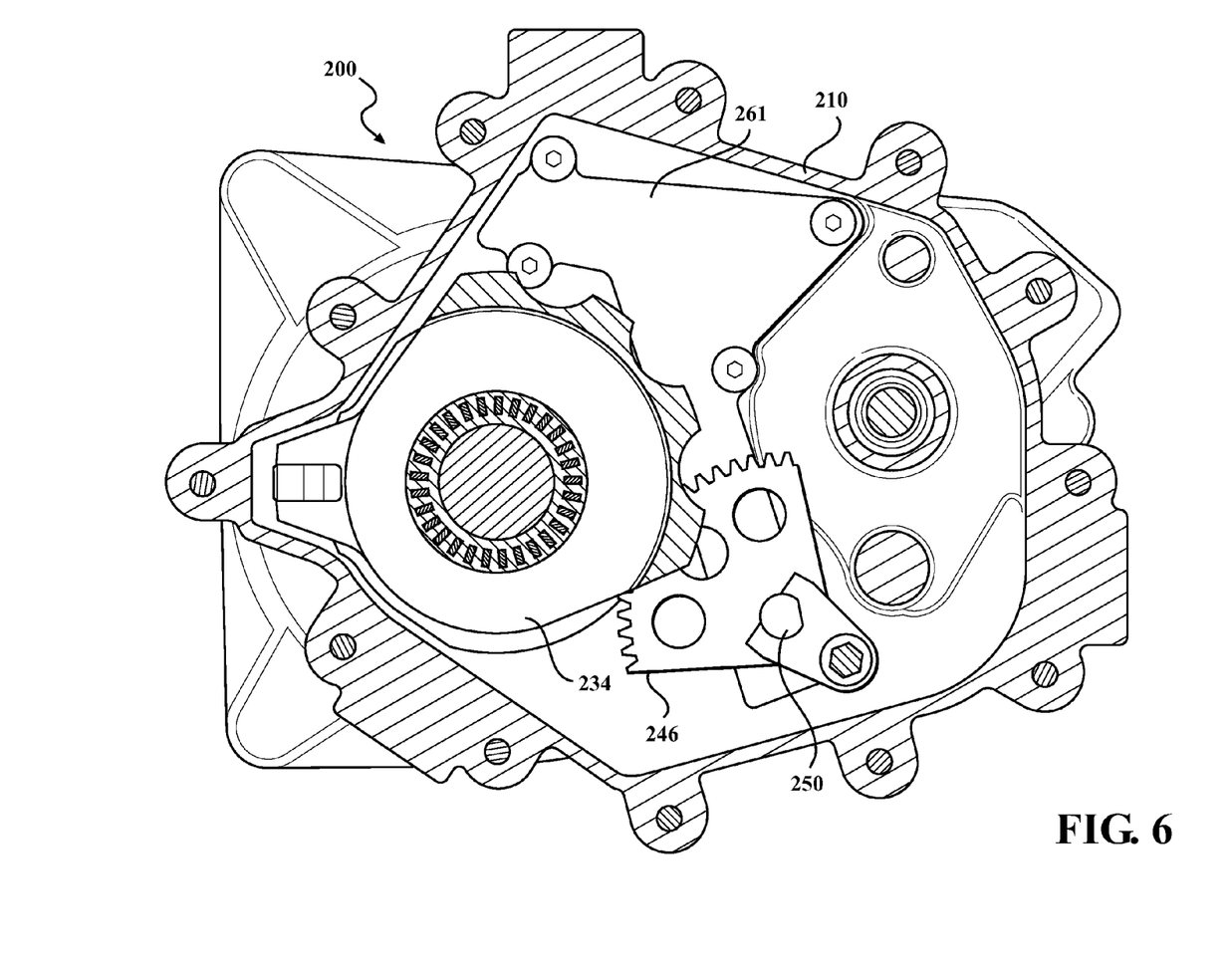
FIG. 6 is a cross-section view of the rotary coupling taken along line D-D of FIG. 3.

As seen in FIGS. 2-4, the rotary coupling 200 includes a housing 210 that surrounds and encloses some of the components of the rotary coupling 200. An input part, such as an input flange 212, and an output part, such as an output hub 214, are accessible from outside of the housing 210. Thus, the input flange 212 and the output hub 214 are connectable to other components of a vehicle drivetrain, such as the driveshaft 118 and the rear differential 122 of the drivetrain 100 for receiving and/or supplying driving power.

The input flange 212 is connected to an input shaft 216, which is supported for rotation with respect to the housing 210 by bearings 218. The input flange 212 rotates in unison with the input shaft 216, such as by a splined connection.

The input shaft 216 is connected to the output hub 214 by a clutch 220. The clutch 220 is disposed within a clutch area 222 of the housing 210 and is disposed radially around the input shaft 216 and the output hub 214. The clutch 220 is movable between an engaged position and a disengaged position to change an amount of torque transferred from the input flange 212 and the input shaft 216 to the output hub 214.

The clutch 220 includes a clutch drum 224. The clutch drum 224 is connected to the output hub 214 for rotation in unison with the output hub 214. The clutch drum 224 has a radial wall 226 that is disposed in the clutch area 222 of the housing. The radial wall 226 of the clutch drum and the clutch area 222 are both generally circular when viewed along the axis of the input shaft 216, with a maximum outside diameter of the radial wall 226 being slightly smaller than an inside diameter of the clutch area 222.

The clutch 220 includes a clutch pack 228. The clutch pack 228 includes a plurality of interleaved clutch plates that are engageable with one another to cause torque transmission from the input shaft 216 to the clutch drum 224. A first group of the interleaved plates of the clutch pack 228 is connected to the input shaft 216. A second group of the interleaved plates of the clutch pack 228 is connected to an interior surface of the radial wall 226 of the clutch drum 224.

The clutch 220 includes an apply plate 230 that is connected to the input shaft 216 for rotation in unison with the input shaft 216 but is able to slide axially with respect to the input shaft 216. For example, the apply plate 230 can be connected to the input shaft 216 by axially extending splines.

The apply plate 230 is operable to apply pressure to the clutch pack 228 by moving axially toward and away from the clutch pack 228. Application of pressure to the clutch pack 228 by the apply plate 230 moves the clutch 220 from a disengaged position toward an engaged position by increasing the degree by which torque is transmitted between the first and second groups of interleaved plates of the clutch pack 228. The apply plate 230 may be biased away from engagement with the clutch pack 228 by one or more springs 232, such that the clutch 220 moves toward the disengaged position as a result of the force applied by the springs 232 absent actuation of the clutch 220 by an external actuator. In this example, actuation is provided by an apply collar 234 that, when rotated, applies pressure to the apply plate 230 via a cam mechanism 236.

In order to actuate movement of the clutch 220 between the engaged and disengaged positions, the rotary coupling 200 includes an actuator 238, such as an electrical motor that is operable to rotate an actuator shaft 240. In the illustrated example, the actuator 238 is connected to the apply collar 234 by engagement of a first sector gear 235 with a drive gear 242. The first sector gear 235 is attached to or formed on the apply collar 234 and extends outward with respect to a nominal diameter of the apply collar 234. The drive gear 242 is attached to or formed on the actuator shaft 240. Thus, rotation of the actuator shaft 240 by the actuator 238 is operable to apply pressure to the clutch pack 228 via the drive gear 242, the first sector gear 235, the apply collar 234, the cam mechanism 236, and the apply plate 230.

In the illustrated example, the clutch 220 and a lubrication valve 250 are both driven between their respective positions by rotation of the actuator shaft 240 by the actuator 238. Thus, a single actuator is operable to control both the clutch 220 and the lubrication valve simultaneously with a rotational action. This arrangement eliminates the need for separate actuators and in some implementations can reduce the need for multiple electrical and/or hydraulic connections that may be required for separate actuators.

As best seen in FIGS. 5-8, the actuator 238 moves the lubrication valve 250 between open and closed positions to control flow of a lubricating fluid to the clutch 220. As examples, the lubricating fluid can be hydraulic fluid or automatic transmission fluid. In the illustrated example, a plurality of gear teeth 244 are formed on the apply collar 234 and thus rotate when the apply collar 234 is rotated by the actuator via the first sector gear 235 and the drive gear 242. A second sector gear 246 is connected to the lubrication valve 250 such that the second sector gear 246 and the lubrication valve 250 rotate on a common axis of rotation. The gear teeth of the second sector gear 246 mesh with the plurality of gear teeth 244 on the apply collar 234 such that the second sector gear 246 rotates in response to rotation of the apply collar 234.

In order to store the lubricating fluid, the housing 210 defines a fluid reservoir 260. One end of the fluid reservoir 260 is sealed from a remainder of the interior of the housing 210 by a cover plate 261. The lubrication valve 250 extends into the fluid reservoir 260, for example, by extending through or adjacent to the cover plate 261.

The fluid reservoir 260 has an inlet 262 that is in communication with the clutch area 222 of the housing 210. Thus, the fluid reservoir 260 receives the lubricating fluid from the clutch area 222 via the inlet 262. The inlet 262 is positioned above the clutch area 222, at the top of the circular shape defined by the clutch area 222. The angular orientation of the rotary coupling 200 shown in FIGS. 5-8 is representative of the angular orientation at which the rotary coupling 200 will be installed when utilized in a vehicle. Thus, as will be explained further herein, the lubricating fluid enters the inlet 262 from the clutch area 222 upon being pumped to the top of the clutch area 222. The lubricating fluid exits the fluid reservoir 260 and is directed to the clutch 220 via a first fluid supply path 270 and a second fluid supply path 272, with the lubrication valve moving between open and closed positions to permit or block fluid from the fluid reservoir 260 to the first fluid supply path 270 and the second fluid supply path 272.

The lubrication valve 250 is a rotary valve that moves between various positions by rotating with respect to the housing 210 along its axis. As previously described, the lubrication valve 250 is rotated by the second sector gear 246. Movement of the lubrication valve 250 is constrained to axial rotation by engagement with surfaces of the housing 210 that engage the lubrication valve 250. It should be understood, however, that other types of valves and actuators could be used.

In order to selectively block and establish fluid flow to the first fluid supply path 270 and the second fluid supply path 272, the lubrication valve 250 defines one or more passages that block or permit fluid flow dependent upon the rotational position of the lubrication valve 250 with respect to the housing 210. In the illustrated example, a first passage 252 and a second passage 254 are formed on the lubrication valve 250.

The first passage 252 of the lubrication valve 250 allows selective fluid supply from the fluid reservoir 260 to the first fluid supply path 270. Rotation of the lubrication valve 250 moves the first passage 252 between an open position and a closed position. In the open position, fluid flow from the fluid reservoir 260 to the first fluid supply path 270 is permitted, with the first passage 252 being at least partially in registration with the fluid reservoir 260. In the closed position, the outer surface of the lubrication valve 250 abuts the fluid reservoir 260 in the area adjacent to the first fluid supply path 270, thereby blocking fluid flow from the fluid reservoir 260 to the first fluid supply path 270.

The second passage 254 of the lubrication valve 250 allows selective fluid supply from the fluid reservoir 260 to the second fluid supply path 272. Rotation of the lubrication valve 250 moves the second passage 254 between an open position and a closed position. In the open position, fluid flow from the fluid reservoir 260 to the second fluid supply path 272 is permitted, with the second passage 254 being at least partially in registration with the fluid reservoir 260. In the closed position, the outer surface of the lubrication valve 250 abuts the fluid reservoir 260 in the area adjacent to the second fluid supply path 272, thereby blocking fluid flow from the fluid reservoir 260 to the second fluid supply path 272.

Because the first passage 252 and the second passage 254 are both formed on the lubrication valve 250, the geometry of the first passage 252 and the second passage 254 dictates the relative timing of opening and closing of the first passage 252 and the second passage 254. For example, by forming the first passage 252 and the second passage 254 on the lubrication valve 250 at similar angles and geometries, rotation of the lubrication valve 250 can cause the first passage 252 and the second passage 254 to open and close concurrently. As an alternative, forming the first passage 252 and the second passage 254 on the lubrication valve 250 at different angles and/or geometries will result in rotation of the lubrication valve 250 causing the first passage 252 and the second passage 254 to open and close at different times. For example, the first passage 252 could open slightly prior to opening of the second passage 254.

Figure 7:
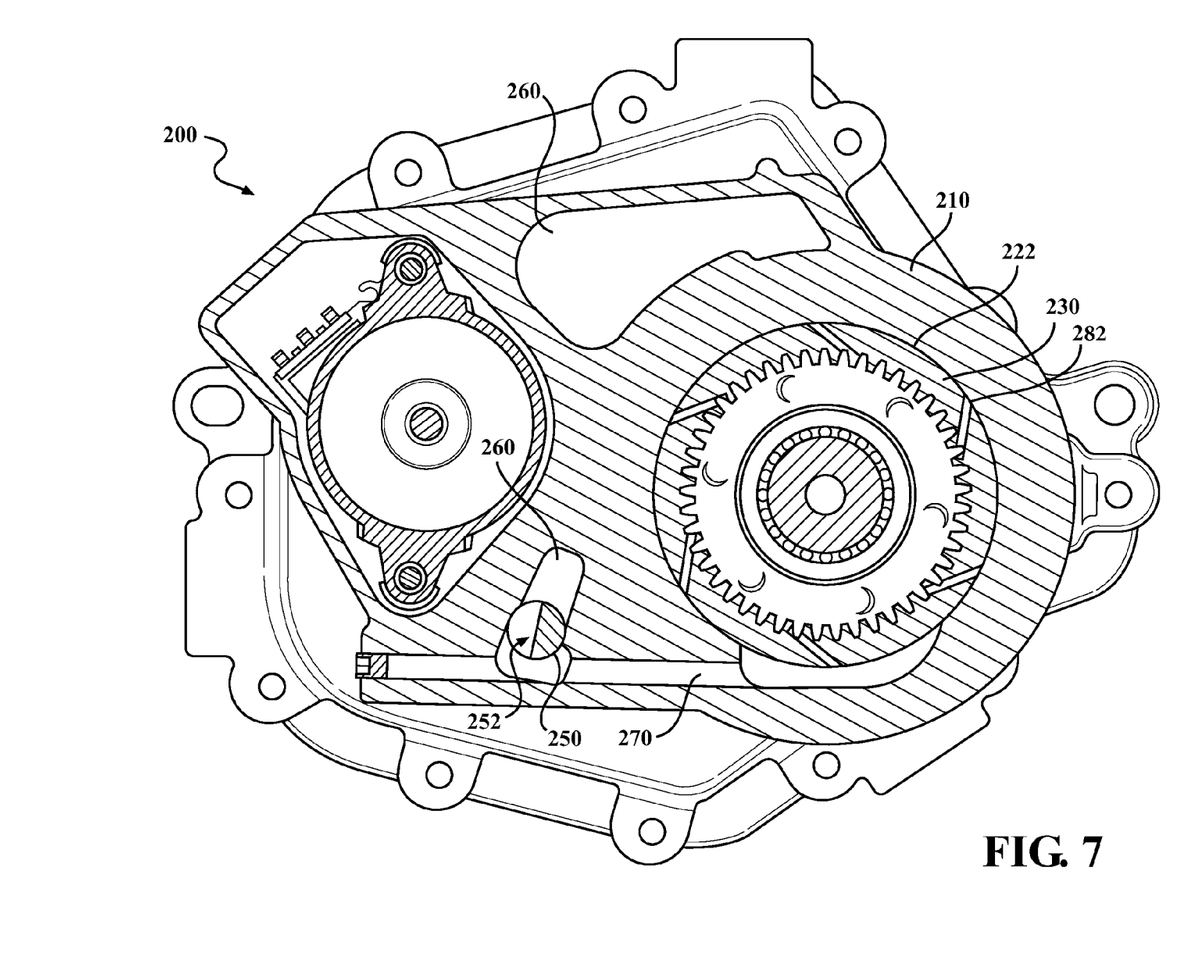
FIG. 7 is a cross-section view of the rotary coupling taken along line B-B of FIG. 3.

The first fluid supply path 270 is operable to supply the lubricating fluid to a first pumping mechanism that is defined by a plurality of channels 282 that are formed in the apply plate 230. The channels 282 extend inward from an outer periphery of the apply plate 230 at an angle with respect to a radial direction, as best seen in FIG. 7. In an alternative implementation, the first pumping mechanism can be formed separately from the apply plate 230, as a disk-shaped member that incorporates the channels 282.

Figure 8:
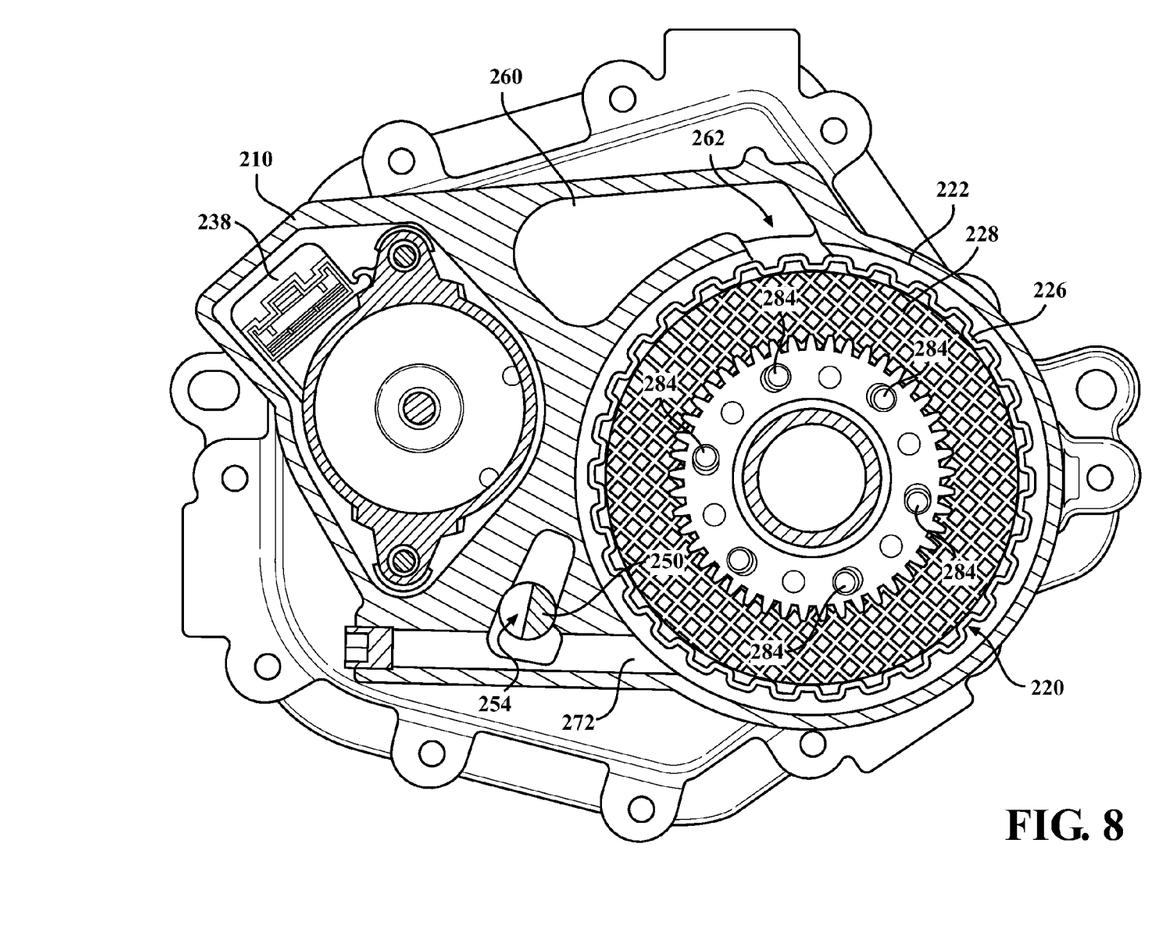
FIG. 8 is a cross-section view of the rotary coupling taken along line A-A of FIG. 3.

As the apply plate 230 rotates in unison with the input shaft 216, the fluid supplied by the first fluid supply path 270 enters the channels 282 and is pressurized and forced radially inward along the channels 282 toward a plurality of axial flow paths 284 that are defined in the input shaft 216, as shown in FIG. 8. The lubricating fluid exits the input shaft 216 via radial ports (not shown) that are formed in the input shaft 216 into the clutch pack 228. The lubricating fluid then exits the clutch pack 228 via radial ports (not shown) that are formed through the radial wall 226 of the clutch drum 224 into the clutch area 222.

The second fluid supply path 272 is operable to supply the lubricating fluid to the clutch area 222 of the housing adjacent to the radial wall 226 of the clutch drum 224. Here, the lubricating fluid from the second fluid supply path 272 joins the lubricating fluid that exits the clutch pack 228 via the radial ports that are formed through the radial wall 226 of the clutch drum 224.

A plurality of features such as axially extending ridges 290 (which may also be referred to as corrugations) are formed on the exterior of the radial wall 226 of the clutch drum 224. Because axially extending ridges 290 are positioned closely to the interior wall of the clutch area 222 of the housing 210, they define a second pumping mechanism that is operable to pump fluid from the clutch area 222 of the housing to the inlet 262 of the fluid reservoir 260. In particular, the axially extending ridges 290 create a variable distance between the clutch drum 224 and the interior wall of the clutch area 222. A portion of the lubricating fluid that is present in the clutch area 222 of the housing 210 becomes captured in the valley between successive ones of the axially extending ridges 290, and enters the reservoir upon reaching the inlet 262. Other types of features can be utilized to define the second pumping mechanism on the clutch drum 224 instead of the axially extending ridges 290.

In operation, the actuator 238 moves the clutch 220 between an engaged position and a disengaged position. Movement of the actuator also moves the first passage 252 and the second passage 254 of the lubrication valve 250 between open and closed positions. When the actuator moves the clutch 220 toward the engaged position (for example, in response to signals from an external control computer), pressure applied to the clutch pack 228 by the apply plate 230 causes the output hub 214 to rotate in response to rotation of the input flange 212. At the same time, the lubrication valve 250 rotates to move the first passage 252 and the second passage 254 to their respective open positions. Fluid from the fluid reservoir 260 is thereby supplied to the clutch pack 228 and the clutch area of the housing 210 via the first fluid supply path 270 and the second fluid supply path 272. While the clutch 220 remains in its engaged position, the lubricating fluid is pressurized by the first pumping mechanism defined by the channels 282 and is also pressurized by the second pumping mechanism defined by the axially extending ridges 290. As a result, the lubricating fluid cycles through the clutch pack and/or the clutch area 222 before repeating the process.

When the actuator moves the clutch 220 to the disengaged position, the clutch pack 228 releases the connection between the input flange 212 and the output hub 214. The lubrication valve 250 also moves the first passage 252 and the second passage 254 to their respective closed positions. Continued motion of the clutch drum 224 (such as parasitic motion or motion driven by the rear wheels 125 of the drivetrain 100) causes the second pumping mechanism to pump a portion of the remaining fluid from the clutch area 222 to the fluid reservoir 260. Because fluid is no longer being supplied via the first fluid supply path 270 and the second fluid supply path 272, the amount of fluid present in the clutch drum 224 and the clutch area 222 is reduced. By reducing the amount of fluid present in the clutch drum 224 and the clutch area 222, parasitic losses are reduced.

While the disclosure has been made in connection with what is presently considered to be the most practical and preferred embodiment, it should be understood that the disclosure is intended to cover various modifications and equivalent arrangements.

The invention claimed is:

1. A rotary coupling (200) for an all-wheel drive vehicle, comprising:
   a housing (210);
   an input part (212);
   an output part (214);
   a clutch (220) that is disposed within a clutch area (222) of the housing (210) and is movable between an engaged position and a disengaged position to change an amount of torque transferred from the input part (212) to the output part (214);
   a fluid reservoir (260) defined in the housing (210);
   a lubrication valve (250) that is movable between an open position and a closed position for controlling supply of a fluid from the fluid reservoir (260) to the clutch area (222) of the housing (210); and
   an actuator (238) that is connected to the clutch (220) to move the clutch (220) between the engaged position and the disengaged position and connected to the lubrication valve (250) to move the lubrication valve (250) between the open position and the closed position.

2. The rotary coupling (200) of claim 1, further comprising:
   a first pumping mechanism that pumps the fluid from the clutch area (222) of the housing (210) into the clutch (220).

3. The rotary coupling (200) of claim 2, wherein the first pumping mechanism includes a plurality of channels (282) formed on the clutch (220) that extend inward from an outer periphery of the clutch (220) at an angle with respect to a radial direction of the clutch (220).

4. The rotary coupling (200) of claim 3, wherein the plurality of channels (282) rotates in unison with the input part (212).

5. The rotary coupling (200) of claim 4, wherein the clutch (220) includes an apply plate (230), and the plurality of channels (282) is formed in the apply plate (230).

6. The rotary coupling (200) of claim 2, further comprising:
   a second pumping mechanism that pumps the fluid from the clutch area (222) of the housing (210) to the fluid reservoir (260).

7. The rotary coupling (200) of claim 6, wherein the second pumping mechanism includes a plurality of features formed on the clutch (220) and positioned closely to an interior wall of the clutch area (222) of the housing (210).

8. The rotary coupling (200) of claim 7, wherein the plurality of features rotates in unison with the output part (214).

9. The rotary coupling (200) of claim 8, wherein the clutch (220) includes the clutch (220) drum, and the plurality of features is formed on the clutch (220) drum.

10. The rotary coupling (200) of claim 9, wherein each feature of the plurality of features is an axially extending ridge that is formed on a radial wall (226) of the clutch (220) drum.

11. The rotary coupling (200) of claim 1, wherein the lubrication valve (250) includes a first passage (252), and a first fluid supply path (270) is defined in the housing (210), wherein the lubrication valve (250) blocks fluid flow from the fluid reservoir (260) to the first fluid supply path (270) in the closed position, and the lubrication valve (250) permits fluid flow from the fluid reservoir (260) to the first fluid supply path (270) via the first passage (252) when the lubrication valve (250) is in the open position.

12. The rotary coupling (200) of claim 11, wherein the first fluid supply path (270) extends from the lubrication valve (250) to the clutch area (222) of the housing (210) adjacent to a first pumping mechanism.

13. The rotary coupling (200) of claim 11, wherein the lubrication valve (250) includes a second passage (254), and a second fluid supply path (272) is defined in the housing (210), wherein the lubrication valve (250) blocks fluid flow from the fluid reservoir (260) to the second fluid supply path (272) in the closed position, and the lubrication valve (250) permits fluid flow from the fluid reservoir (260) to the second fluid supply path (272) via the second passage (254) when the lubrication valve (250) is in the open position.

14. The rotary coupling (200) of claim 13, wherein the first fluid supply path (270) extends from the lubrication valve (250) to the clutch area (222) of the housing (210) adjacent to a second pumping mechanism.

15. A drivetrain (100) for an all-wheel drive vehicle, comprising:
   an engine (110);
   a transmission (112);
   at least a first wheel; and
   a rotary coupling (200) that is operable to selectively deliver driving power to the first wheel, the rotary coupling (200) including:
   a housing (210),
   an input part (212),
   an output part (214),
   a clutch (220) that is disposed within a clutch area (222) of the housing (210) and is movable between an engaged position and a disengaged position to change an amount of torque transferred from the input part (212) to the output part (214),
   a fluid reservoir (260) defined in the housing (210),
   a lubrication valve (250) that is movable between an open position and a closed position for controlling supply of a fluid from the fluid reservoir (260) to the clutch area (222) of the housing (210), and
   an actuator (238) that is connected to the clutch (220) to move the clutch (220) between the engaged position and the disengaged position and connected to the lubrication valve (250) to move the lubrication valve (250) between the open position and the closed position.

* * * * *